United States Patent [19]

Chu et al.

[11] Patent Number: 5,188,867
[45] Date of Patent: Feb. 23, 1993

[54] LOW COEFFICIENT OF FRICTION MATERIAL AND PLASTIC FILMS COATED THEREWITH

[75] Inventors: Shaw-Chang Chu, West Winsor, N.J.; Kevin A. Kirk, Macedon, N.Y.

[73] Assignee: Mobil Oil Corporation, Fairfax, Va.

[21] Appl. No.: 676,020

[22] Filed: Mar. 27, 1991

Related U.S. Application Data

[62] Division of Ser. No. 303,897, Jan. 30, 1989, abandoned.

[51] Int. Cl.$^5$ .............................................. B32B 27/08
[52] U.S. Cl. ................................. 427/173; 427/172; 428/484; 428/516; 428/520
[58] Field of Search .................. 428/516, 520, 484; 427/172, 173

[56] References Cited

U.S. PATENT DOCUMENTS

| | | | |
|---|---|---|---|
| 4,086,317 | 4/1978 | Miyabe | 427/173 |
| 4,391,767 | 7/1983 | Pears | 427/173 |
| 4,981,758 | 1/1991 | Chu et al. | 428/516 |

Primary Examiner—Paul R. Michl
Assistant Examiner—Andrew E. C. Merriam
Attorney, Agent, or Firm—Alexander J. McKillop; Charles J. Speciale

[57] ABSTRACT

A coating for a thermoplastic film includes an acrylic copolymer, a finely divided wax in the amount of 30 to 150%, preferably 30 to 60%, by weight based on the total weight of the copolymer, a finely divided inorganic solid selected from the group consisting of silica, diatomaceous earth, calcium silicate, bentonite and finely divided clays in the amount of 5 to 25% by weight based on the total weight of the copolymer and either talc or Syloid in the amount of 0 to 1% based on the total weight of the copolymer. The coated film has a low haze, non-blocking and consistently low coefficient of friction for good machinability. The coating is applied to a surface of the film as an aqueous dispersion preferably by a gravure coater placed between the machine direction orienter and the transverse direction orienter in an extruding system for the film. This film can be laminated to another film such as glassine or a plastic film.

14 Claims, No Drawings

LOW COEFFICIENT OF FRICTION MATERIAL AND PLASTIC FILMS COATED THEREWITH

This is a division of application Ser. No. 303,897, filed Jan. 30, 1989 now abandoned.

FIELD OF THE INVENTION

The present invention relates to a low coefficient of friction material which when applied to a thermoplastic film results in a film structure having low haze, non-blocking and consistently low coefficient of friction for good machinability. The present invention also relates to a method of applying the material to a surface of the plastic film.

BACKGROUND OF THE INVENTION

Polypropylene films are widely used in the packaging industry because of their superior physical properties, such as high tensile modulus and stiffness, excellent optical clarity, and good moisture barrier characteristics. However, unmodified polypropylene has the disadvantage of having a high inherent coefficient of friction and film-to-film destructive blocking on storage. In the past, the coefficient of friction characteristics of polypropylene and other thermoplastic films have been beneficially modified by the inclusion in the polymer of fatty acid amides. See, for example, U.S. Pat. No. 3,176,021 for such a modified material. The effectiveness of the amides relies upon their ability to migrate to the surface of the films in order to reduce the coefficient of friction. While such amides do improve the coefficient of friction of the films, the value of the coefficient of friction is subject to wide variation depending upon the heat history which the film experiences during shipping, storage, and certain converting processes. In addition, the presence of such amides on the film surfaces can adversely affect the film's appearance as manifested by an increase in haze, a decrease in gloss and the presence of streaks. The presence of such amides on the surface can also adversely affect the wettability and adhesion of solvent and water-based inks, coatings, and adhesives.

In U.S. Pat. No. 4,533,509 to L. J. Gust et al, issued Aug. 6, 1985, entitled LOW COEFFICIENT OF FRICTION FILM STRUCTURE AND METHOD OF FORMING THE SAME, and U.S. Pat. No. 4,618,527 to R. H. Doyen, issued Oct. 21, 1986 entitled GOOD MACHINABILITY FILM STRUCTURE, there is described a multi-layer structure comprising a comparatively thick base layer of an optically clear thermoplastic resin and a comparatively thin surface layer containing a finely divided inorganic material in a proportion sufficient to thereby impart anti-block characteristics and decrease film-to-film coefficient of friction. The resulting film has non-blocking and improved slip characteristics which are stable regarding heat history without any adverse effects on appearance, wetting and adhesion as typically experienced with amide-modified films. However, when laminated to other films, e.g. glassine paper, such structures exhibit significantly higher coefficient of friction values and do not perform flawlessly on conventional form, fill and seal machines.

SUMMARY OF THE INVENTION

A coating for a thermoplastic film includes a mixture of an acrylic copolymer; a finely divided wax in the amount of 30 to 150% by weight based on the total weight of the acrylic copolymer; a finely divided inorganic solid selected from the group consisting of silica, diatomaceous earth, calcium silicate, bentonite and finely divided clays in the amount of 5 to 25% by weight based on the total weight of the acrylic copolymer; and either talc or Syloid in the amount of 0 to 1% by weight based on the total weight of the copolymer. The coating composition when applied to a suitable substrate film has the improved properties of low haze, excellent non-blocking and a consistently low coefficient of friction. The film has these properties even when laminated to another film, such as glassine or a plastic film.

DETAILED DESCRIPTION OF PREFERRED EMBODIMENTS

The coating composition of the present invention is composed of an acrylic copolymer, a finely divided wax, a finely divided inorganic solid material, and optionally, a small amount of either talc or Syloid. syloid is the registered trademark of W. R. Grace & Co. for micron-sized synthetic silica. The acrylic copolymer comprises 2 to 20 parts by weight of an $\alpha, \beta$-monoethelenically unsaturated carboxylic acid selected from the group consisting of acrylic acid, methacrylic acid and mixtures thereof, and 98 to 80 parts by weight of neutral monomer esters. The neutral monomer esters comprise an alkyl acrylate ester and an alkyl methacrylate ester. This acrylic copolymer and how it is made is described in more detail in U.S. Pat. No. 3,753,769 to Robert H. Steiner, issued Aug. 21, 1973, entitled COATING COMPOSITION AND PLASTIC ARTICLES COATED THEREWITH, which is incorporated herein by reference. The finely divided wax may be a natural wax, such as paraffin wax, microcrystalline wax, beeswax, carnauba wax, japan wax, montan wax, etc., or a synthetic wax, such as a hydrogenated castor oil, chlorinated hydrocarbon wax, long chain fatty acid amides, etc. The wax is present in the amount of 30 to 150% by weight based on the total weight of the acrylic copolymer, and preferably in the amount of 30 to 60% by weight based on the total weight of the acrylic copolymer. The finely divided inorganic solid material is selected from the group consisting of silica, diatomacious earth, calcium silicate, bentonite and finely divided clays, and is present in the amount of 5 to 25% by weight based on the total weight of the acrylic copolymer. The talc or Syloid is present in the amount of 0 to 1% by weight based on the total weight of the acrylic copolymer.

The coating composition of the present invention can be applied to the surface of a film material in any convenient and known manner, such as by gravure coating, roll coating, dipping, spraying etc. However, it is preferable to apply it by a gravure coater which can be positioned between the machine direction (MD) orienter and the transverse direction (TD) orienter in an extruding system for the film. Also, the surface of the film is preferably treated to insure that the coating will be strongly adherent to the film. This treatment may be accomplished by employing known prior art techniques, such as for example, film chlorination, i.e. exposure of the film to gaseous chlorine; treatment with oxidizing agents such as chromic acid; hot air or steam treatment; flame treatment and the like. However, a particularly desirable method of treatment has been found to be the so called electronic treatment which comprises exposing the film surface to a high voltage corona discharge while passing the film between a pair of spaced electrodes. After electronic treatment of the substrate film surface, it may be coated with the coating composition of the present invention which coating will then exhibit a tendency to more strongly adhere to the treated film surface.

It is possible to add the coating composition of the present invention onto the surface of the treated film substrate from a non-aqueous solution of the composition using, for example, various organic solvents such as alcohols, ketones, esters, etc. However, since the coating compositions of the present invention contain colloidal inorganic materials and since such materials are difficult to keep well dispersed in organic solvents, it is preferable that the coating compositions of the present invention be applied from aqueous media and preferably from an alkaline aqueous solution thereof.

EXAMPLE I

An aqueous coating dispersion was prepared in a 5 liter flask by mixing the following ingredients:

| | Parts by weight |
|---|---|
| Deionized water | 680 |
| Acrylic Emulsion (33.5%) | 1,300 |
| Aqueous Ammonia (7.36%) | 20 |
| Ludox Silica Dispersion (20%) | 218 |
| Carnauba Wax Emulsion (20%) | 784 |
| Talc (5%) | 87 |

The acrylic emulsion was supplied by Valspar Corporation and was a copolymer of 51.5% methyl methacrylate, 44.5% methyl acrylate, and 4.0% methylacrylic acid. The coating dispersion had a solids content of 20.7%, a pH of 8.0, and viscosity (Brookfield) of 20 centipoise.

The coating dispersion was placed in a gravure coater which had been installed between the MD orienter and the TD orienter of a pilot scale film orienter. Polypropylene resin (Fina 828) was extruded through a flat sheet die at 250° C., cast onto a cooling drum and quenched at 30° C. The sheet, measured about 30 mil thick, was reheated to 140° C. and stretched 5 fold in the MD, then corona treated for improved surface wettability. When passing through the gravure coater, the MD oriented film web, now about 6 mil thick, was coated with the coating dispersion. The coated web was dried in preheat zones at 160° C., then stretched 8 fold in the TD orienter at 145° C. and annealed at 160° C. The biaxially stretched film, measured 0.75 mil thick, was corona treated on the uncoated side to improve the wettability and adhesion of ink and adhesives that might be applied later on. The coated film had the following properties:

| | |
|---|---|
| Coefficient of friction | 0.15–0.40 |
| Blocking | <5 g/inch |
| Haze | ≦2.5% |
| Gloss at 45° | ≧80 |
| Coating Weight | 0.1–0.4 mg/in$^2$ |

EXAMPLE II

A series of coating compositions were prepared in the same manner as described in EXAMPLE I. In these compositions, the weight percentage of the silica, wax, and talc were varied as shown in TABLE I.

TABLE I

| Sample | Acrylic | Silica | Wax | Talc | COF |
|---|---|---|---|---|---|
| 2 | 100 | 10 | 36 | 0.25 | 0.28 |
| 3 | 100 | 10 | 40 | 0.25 | 0.21 |
| 4 | 100 | 10 | 40 | 1.0 | 0.27 |
| 5 | 100 | 10 | 45 | 0.25 | 0.18 |
| 6 | 100 | 10 | 45 | 1.0 | 0.20 |
| 7 | 100 | 10 | 50 | 1.0 | 0.19 |
| 8 | 100 | 20 | 50 | 1.0 | 0.23 |
| 9 | 100 | 10 | 55 | 1.0 | 0.18 |
| 10 | 100 | 10 | 60 | 1.0 | 0.18 |

The coefficient of friction (COF) of each of these samples is shown in TABLE I and was measured from coated films with similar coating weights of about 0.2 mg/in$^2$.

EXAMPLE III

The control coating compositions shown in TABLE II were made under the same conditions as described in EXAMPLE I:

TABLE II

| Sample | Acrylic | Silica | Wax | Talc | Comments |
|---|---|---|---|---|---|
| A | 100 | 40 | 9 | 0.1 | Very hazy film and unacceptable COF (0.60) |
| B | 100 | 10 | 9 | 0.25 | Very clear film but unacceptable COF (0.58) |
| C | 100 | 10 | 18 | 0.25 | Very clear film but unacceptable COF (0.49) |

The composition of Sample A was a heat seal coating based on the coatings described in U.S. Pat. No. 3,753,769 to Robert H. Steiner.

EXAMPLE IV

The slip coated films obtained from EXAMPLE I, hereinafter referred to as Sample 1, Samples 3, 4, and 8 of EXAMPLE II, Sample B of EXAMPLE III, and two additional control Samples were extrusion laminated by means of a low density polyethylene adhesive to a 1.6 mil thick glassine paper and tested on Mira-Pak Miramatic Model L vertical form, fill and seal packaging machine and the results are given in TABLE III.

TABLE III

| Sample | COF | FOFC (lbs) |
|---|---|---|
| 1 | 0.16 | 15 |
| 3 | 0.21 | 19 |
| 4 | 0.20 | 20 |
| 8 | 0.13 | 16 |
| B | 0.60 | 45 |
| 75 LCM-W | 0.21 | 34 |
| 410 LCM | 0.20 | 20 |

Sample 75 LCM-W was a commercial slip film based on U.S. Pat. No. 4,618,527, and Sample 410 LCM was a commercial slip film based on erucamide as the sole slip agent.

For practical commercial packaging applications, the force over the forming collar (FOFC) should be less than 30 lbs. for a supported film. Otherwise, the film will risk machine downtime because of machine jamming and high squeal noise. Samples 1, 3, 4 and 8 made in accordance with the present invention all had FOFC values well below 30 lbs. and therefore they can be used satisfactorily on the packaging machinery with high reliability.

It can be seen from EXAMPLES I and II that all of the coating compositions of the present invention had low coefficient of friction. When comparing the compositions of EXAMPLES I and II with those of the control compositions in EXAMPLE III, which had much higher coefficients of friction, it can be seen that the compositions of the present invention contains a much higher amount of the wax. This high content of the wax greatly reduces the coefficient of friction. However, as can be seen from EXAMPLE I, the high content of wax does not adversely affect the blocking characteristics, haze or gloss of the material. Thus, there is provided by the present invention coating compositions which when applied to a thermoplastic film have much lower coefficients of friction yet have good blocking characteristics, good haze and good gloss characteristics. In addition, when the coated film of the present invention is laminated with another material, such as glassine, it maintains its low coefficient of friction and has good characteristics for use in form, fill and seal packaging machinery.

We claim:

1. A method of making a coated plastic film having a low coefficient of friction, comprising the steps of:
   (a) passing a thermoplastic film through a machine direction orienter;
   (b) coating the machine oriented film with a coating material comprising (i) a copolymer of acrylic acid comprising 2 to 20 parts by weight of an α, β-monoethelenically unsaturated carboxylic acid selected from the group consisting of acrylic acid, methacrylic acid and mixtures thereof and 98 to 80 parts by weight of neutral monomer ester, said neutral monomer esters comprising an alkyl acrylate ester, and an alkyl methacrylate ester, (ii) a slip agent consisting of a finely divided wax in the amount of 30 to 150% by weight based on the total weight of the acrylic copolymer, and (iii) a finely divided inorganic solid material in an amount of 5 to 25% by weight based on the total weight of the acrylic copolymer; and
   (c) passing the coated plastic film through a transverse direction orienter.

2. The method of claim 1 wherein the wax comprises paraffin wax, microcrystalline wax, beeswax, carnauba wax, japan wax, montan wax, hydrogenated castor oil, chlorinated hydrocarbon wax, or long chain fatty acid amides.

3. The method of claim 1 wherein the coating material further comprises talc in an amount up to 1% by weight based on the total weight of the acrylic copolymer.

4. The method of claim 1 wherein the coating material is an aqueous media.

5. The method of claim 1 further comprising treating the surface of the plastic film that is to be coated with the coating material, prior to the coating step, to improve the wettability thereof.

6. The method of claim 5 wherein the treating step comprises exposing the film surface to a corona discharge.

7. The method of claim 6 wherein the coating material is applied to the film by a gravure coater.

8. The method of claim 1 wherein the finely divided inorganic solid material is selected from the group consisting of silica, diatomaceous earth, calcium silicate, bentonite, and finely divided clays.

9. The method of claim 1 wherein the finely divided wax is in an amount from 30 to 60% by weight based on the total weight of the acrylic copolymer.

10. The method of claim 9 wherein the coating material further comprises talc in an amount up to 1% by weight based on the total weight of the acrylic copolymer.

11. The method of claim 9 further comprising treating the surface of the plastic film that is to be coated with the coating material, prior to the coating step, to improve the wettability thereof.

12. The method of claim 11 wherein the treating step comprises exposing the film surface to a corona discharge.

13. The method of claim 12 wherein the coating material is applied to the film by a gravure coater.

14. The method of claim 9 wherein the finely divided inorganic solid material is selected from the group consisting of silica, diatomaceous earth, calcium silicate, bentonite, and finely divided clays.

* * * * *